(12) United States Patent
Zintel et al.

(10) Patent No.: US 7,613,828 B2
(45) Date of Patent: Nov. 3, 2009

(54) STORE-AND-FORWARD MESSAGING CHANNEL FOR OCCASIONALLY CONNECTED MOBILE APPLICATIONS

(75) Inventors: William M. Zintel, Kenmore, WA (US); Roman Batoukov, Sammamish, WA (US); Sergiy Kuryata, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 296 days.

(21) Appl. No.: 11/622,577

(22) Filed: Jan. 12, 2007

(65) Prior Publication Data

US 2008/0172467 A1    Jul. 17, 2008

(51) Int. Cl.
*G06F 15/173* (2006.01)
(52) U.S. Cl. .................................... 709/239; 709/218
(58) Field of Classification Search ............... 709/218, 709/201–203, 239; 719/330
See application file for complete search history.

(56) References Cited

U.S. PATENT DOCUMENTS

| | | | |
|---|---|---|---|
| 5,845,090 | A | 12/1998 | Collins, III et al. |
| 5,926,789 | A | 7/1999 | Barbara et al. |
| 5,960,404 | A | 9/1999 | Chaar et al. |
| 2003/0208567 | A1 | 11/2003 | Gross |
| 2004/0260786 | A1 | 12/2004 | Barile |
| 2005/0243804 | A1* | 11/2005 | Watai .................... 370/352 |
| 2006/0010096 | A1 | 1/2006 | Crossland et al. |
| 2006/0026168 | A1 | 2/2006 | Bosworth et al. |
| 2006/0101212 | A1 | 5/2006 | Biswal et al. |
| 2006/0112398 | A1 | 5/2006 | Mukkamala et al. |
| 2006/0123010 | A1 | 6/2006 | Landry et al. |

FOREIGN PATENT DOCUMENTS

JP    2005-173900    *    6/2005

OTHER PUBLICATIONS

Thurston et al., Web Services Security: SOAP Message Security 1.0 (WS-Security 2004), Mar. 2004, OASIS Standard 200401.*
Christensen et al., Web Services Description Language (WSDL) 1.1, Mar. 15, 2001, W3C.*
Box et al., Web Services Addressing (WS-Addressing), Aug. 10, 2004, W3C.*

(Continued)

*Primary Examiner*—Nathan J Flynn
*Assistant Examiner*—James E Conaway
(74) *Attorney, Agent, or Firm*—Workman Nydegger

(57) ABSTRACT

Sending and receiving application or service data through an email transport for mobile computing devices occasionally disconnected from network connectivity. At a sending service or application, application or service data is intercepted from the application or service. The application or service data is packaged in an email message. The email message includes the application or service data within the email envelope and an identification of an application or service client to which the application or service data should be applied at a client computer system. The email message is sent through an email transport to a mobile client computer system which includes the application or service to which the application or service data should be applied. At the client the email message is intercepted. The data is extracted from the email envelope. The application or service client is identified. The data is routed to the appropriate application or service.

17 Claims, 2 Drawing Sheets

OTHER PUBLICATIONS

Cunnings et al., SMTP Transport Binding for SOAP 1.1, Nov. 29, 2001, W3C.*

Jason, Re: SOAP over SMTP/POP, Oct. 2002, osdir mail archive.*

Mitra et al., SOAP Version 1.2 Part 0: primer, Dec. 17, 2001, W3C.*

Chawke, Making Apache SOAP invocations using SMTP, Mar. 9, 2001, http://markmail.org/download.xqy?id=6qxovbnru7aojhxs&number=1.*

Immamura et al., XML Encryption Syntax and Processing, Aug. 2, 2002, W3C.*

Fall, A Delay-tolerant network architecture for challenged internets, 2003.*

Howard, John H., "Using reconciliation to share files between occasionally connected computers," Mitsubishi Electric Research Labs, Cambridge Research Center, May 27, 1993, Copyright Mitsubishi Electric Research Laboratories, Inc., 6 pages.

Johnson, D. Britton, "Occasionally connected computing architectures—Storage Management", Computer Technology Review, Sep. 2003.

Sutton, Peter, et al., "Supporting Disconnectedness—Transparent Information Delivery for Mobile and Invisible Computing", 2001 IEEE, pp. 277-285.

* cited by examiner

STORE-AND-FORWARD MESSAGING CHANNEL FOR OCCASIONALLY CONNECTED MOBILE APPLICATIONS

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. Notably "or" as used herein, unless otherwise specified, is intended to be read as a non-exclusive "or" which allows for one or the other or both. The connections allow a computing system to access services at other computing systems and to quickly and efficiently receive application data from other computing systems.

In recent times, mobile computing devices have become ubiquitously common. Examples of mobile computing devices include, without limitation, laptops, PDAs, cellphones, and the like. Each of these mobile computing devices can host various applications and services. Even many cellphones include applications and services to perform email operations, word processing operations, database operations, internet browsing, instant messaging, and a host of other operations.

Presently inherent in their mobility, mobile computing devices may be occasionally or frequently disconnected from connections, such as network connections, to other computing systems. For example, when a PDA is removed from its docking cradle, the PDA will typically be disconnected from its host computer and from one or more networks including the network between the PDA and the host computer system, and between the PDA and other networks and/or computer systems that the PDA typically accesses through its host computer's network connection. If a PDA or laptop includes wireless Ethernet connectivity, the PDA or laptop may be moved to an area where the wireless Ethernet is not available. Mobile phones may only be connected to mobile wireless connections by direct request from a user, or even when a semi-constant connection is maintained, the connection may be broken when mobile wireless connections are lost.

However, some services and applications may desire to send data as if a computing device is constantly connected. If the computing device is not connected when data is sent, the data may be lost. Additionally, addresses for mobile devices may not be discoverable in the ordinarily used methods for discovering addresses.

Illustratively, often data is sent using an identifier such as an IP address. However, when a device becomes disconnected, the IP address may be lost. Thus, data sent to a previously valid IP address may be lost or at least not reach its intended destination. Additionally, in one illustrative example, there are no suitable methods for discovering an IP address for a cellular telephone on a mobile operator network.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment disclosed herein is directed to a method which may be practiced in a mobile network computing environment including mobile computing devices that may be occasionally or frequently disconnected from network connectivity. The method includes acts for receiving application or service data that is typically received via a network transport. The method includes intercepting an email message. The email message includes application or service data within the email envelope and an identification of an application or service to which the application or service data should be applied. The application or service data is extracted from the email envelope. An application or service client is identified from among a number of applications or services, where the identified application or service is the application or service to which the application or service data should be applied. The application data is routed to an appropriate application or service as identified Another embodiment disclosed herein may also be practiced in a mobile network computing environment including mobile computing devices that may be occasionally or frequently disconnected from network connectivity. The method includes acts for sending application or service data that is typically sent via a network transport. The method includes intercepting application or service data from an application or service. The application or service data is packaged in an email message. The email message includes the application or service data within the email envelope and an identification of an application or service client to which the application or service data should be applied at a client computer system. The email message is sent through an email transport to a mobile client computer system which includes the application or service to which the application or service data should be applied. Notably, the email message may not be immediately sent, but rather may be held at the system until network connectivity is available. However, network connectivity is transparent to the application or service in that the application or service can simply assume that data will be sent.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
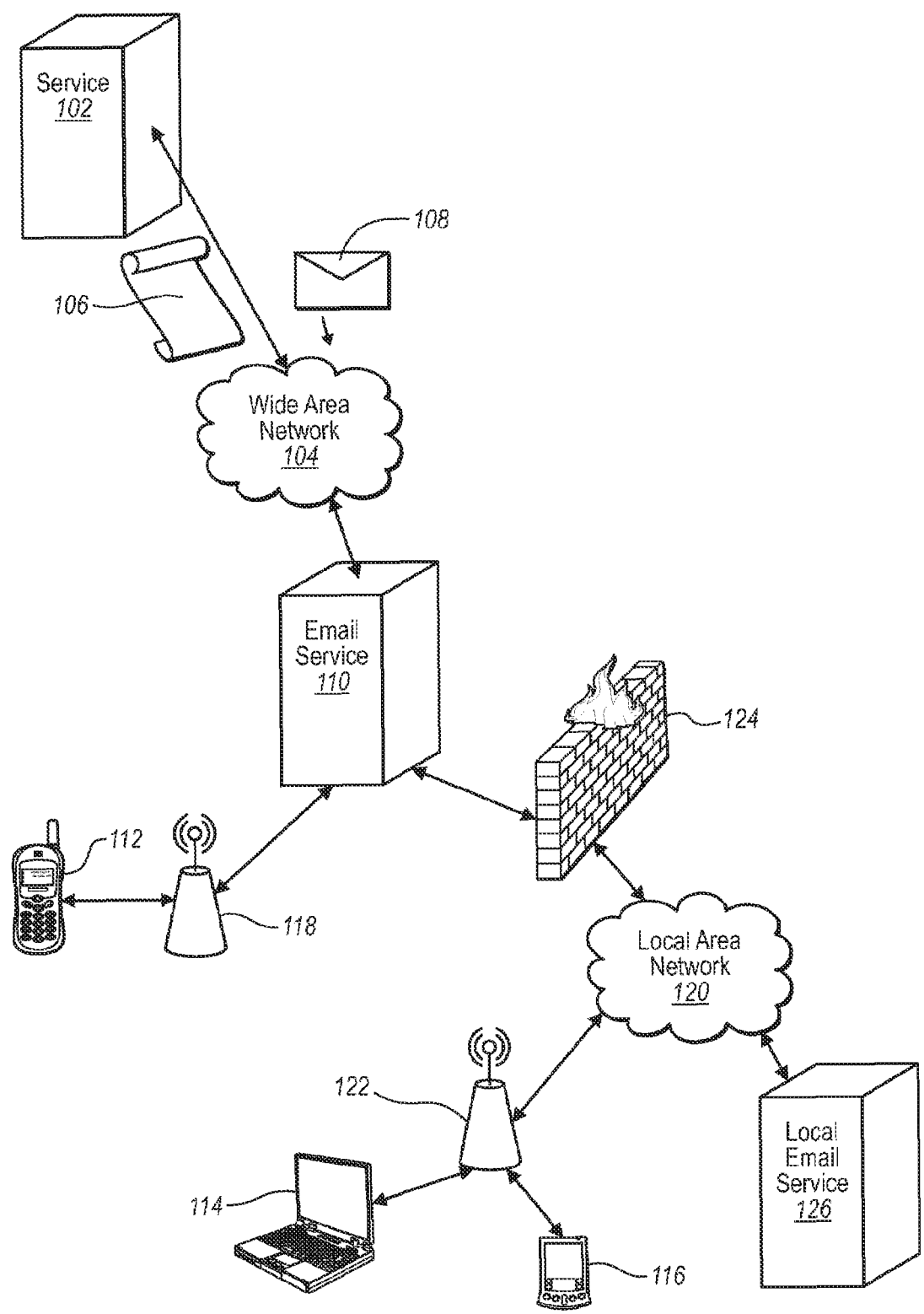
FIG. 1 illustrates an environment including a number of wireless devices and email infrastructure.

Embodiments herein may comprise a special purpose or general-purpose computer including various computer hardware, as discussed in greater detail below.

One embodiment described herein includes functionality for using email messages and envelopes to transport application or service data. Using an email infrastructure, application and service data can be transmitted on a store and forward basis. This allows application and service data to be transmitted to devices which are occasionally or frequently disconnected from a network.

Notably, some embodiments allow for email to be used as a transport, when other transports, such as TCP or HTTP, fail due to disconnection from a network or for other reasons. Thus, when ordinarily used transports are available, they can be used, while an email transport fall-back scheme provides a secondary path for data.

Additionally, by using an email transport, existing infrastructure may be used with minimal or no modifications. For example, using the email transport, application and service data can be transmitted as an email message to existing email servers without the need to modify the email servers. Hardware and software at originating and end points of the data can handle data routing without the need for specialized email servers in between. Additionally, traditional encryption schemes that have typically been used for email messages can be used to encrypt the application or service data. Also, application and service data can be signed and encrypted prior to being included in the email message. Further, because traditional NAT and firewall boundaries are permeable by email messages, the application or service data can be transmitted through these NAT and firewall boundaries as email messages.

Further still, by using an email address for routing the application or service data, a constant unchanging address can prevent misrouting of data. For example, an email address may identify the mobile device and may further be implemented such that all email sent to the particular address is known to include application or service data. Thus, any messages sent to the particular address can be intercepted, the application or service data stripped from the message, and the application or service data routed to an appropriate application or service client. Notably, a single email address may be used for one or more device.

Illustratively, in one embodiment, at a service or data provider system, computer implemented modules may be implemented which intercept application or service data from an application or service. The application or service data is packaged in an email message. The email message is then sent through an email transport to a computing device which includes an application or service client to which the data should be applied.

At the client, the email message is intercepted. The application or service data is extracted from the email envelope. An application or service client to which the data applies is identified. The application or service data is then sent to the application or service client.

Referring now to FIG. 1, an illustrative embodiment is shown. In the embodiment illustrated in FIG. 1, a service 102 is connected to a wide area network 104. In this example, the service includes functionality for providing service or application data. The service or application data can be provided using ordinarily used transports such as TCP, http, and the like. This is illustrated in FIG. 1 by the message 106. In one embodiment, if the ordinarily used transports fail, then messages may be sent using an email envelope 108 where the email envelope 108 includes service or application data. Notably, the use of the alternative "or" in this context and throughout this document, unless otherwise denoted, is not intended to limit exclusively. For example the data may be exclusively either service or application data or a combination of application and service data can be included in the email envelope 108.

As described previously, the service 102 can intercept service or application data from a service or application. The service or application data can then be packaged in an email envelope 108. Additionally, information can be packaged in the email envelope 108 indicating a service or client application to which the data in the email envelope 108 applies.

The email envelope 108 can be sent to the wide area network 104. As illustrated and FIG. 1, an email service 110 is connected to the wide area network 104. The email service 110 receives the email envelope 108. The email envelope 108 includes an email address which can be used to identify a target client computer system. Notably, as explained previously, a single email address may be used for one or more systems or one or more applications or services on the one or more systems. Thus, in some embodiments, a single email address may be used for multiple systems and multiple services or applications. A particular client system may be identified, for example, by other information in the email message including information in the application or service data. As such, the email service 110 provides functionality for routing the email envelope 108 to the appropriate client. This may be accomplished in several different alternative fashions. For example, in one embodiment, the email service 110 can forward the email envelope 108 to other email services that are either able to further forward the email envelope 108 or that are accessible by a target client which can then either pull the email envelope 108 from the email service or receive the email envelope 108 as a result of the email service pushing the email envelope 108 to the client.

Various clients are illustrated in FIG. 1. For example, FIG. 1 illustrates a cellular telephone 112 which may be a client of the email service 110. FIG. 1 further illustrates a laptop 114 and a PDA 116 which are clients of the email service 110.

FIG. 1 illustrates that the cellular telephone 112 is connected to the email service 110 through a cellular network 118. Illustratively, an attempt to send service or application data may be performed by sending a message 106 containing the application or service data. If the attempt to send the application or service data using the message 106 fails, the application or service data may be sent in an email envelope 108. The email envelope 108 is sent to the wide area network 104, which may be the Internet, a corporate network, or other suitable network. The email envelope 108 is sent to the email service 110. The email service 110 may be connected to a cellular telephone network provider represented at 118. While in the example illustrated, the cellular network 118 is connected directly to the email service 110, other embodiments may alternatively be implemented. For example, a cellular telephone provider may provide various services to telephone users by allowing connection to the wide area network 104. In such an example, the cellular telephone can request email messages from the email service 110 by sending a request to the cellular network 118 which is connected to one or more computing devices connected to the wide area network 104 which is connected to the email service 110. As such, when the cellular telephone 112 is able to receive messages, the messages can be either retrieved from the email service 110 or pushed from the email service 110 to the cellular telephone. Other technologies for delivering email messages to mobile devices may also be used, including other pull type methods and infrastructures using push type methods where emails are pushed from a server to a client system.

The cellular telephone 112 may include a computer-readable storage medium including computer executable instructions configured to implement a mail handling client. In one embodiment, the mail handling client can detect that the email envelope 108 includes an indication that the email message and the email envelope 108 contains application or service data intended for an application or service client executing on the cellular telephone 112. For example, in one embodiment, the email address to which the email envelope 108 is addressed may be an address dedicated to sending and receiving application or service data. Alternatively, the email address to which the email envelope 108 is addressed may be a generic address usable for both regular email communications as well as for the transport of application or service data. In this case, the mail handling client may be configured to examine other fields in the email envelope 108. For example, the subject line may include information indicating that the email envelope 108 contains application or service date intended for an application or service client running on the cellular telephone 112. Still other fields may be used including other header or footer fields or specialized text in the message body of the email envelope 108.

Once the email envelope 108 has been identified as a message containing application or service data, the application or service data may be stripped from the email envelope 108 and forwarded to the appropriate application or service client executing on the cellular telephone 112. Identification of the appropriate application or service client may be accomplished in a number of different ways. One or more properties of the email message may be used. For example, the email address field including the email address to which the email envelope 108 is addressed may include an indicator indicating the appropriate application or service client. Alternatively, the subject line may contain information identifying the appropriate application or service client. In yet another alternative embodiment, various other header or footer fields may include information identifying the appropriate application or service client. In still other embodiments, the message body may contain specialized information identifiable as indicating the appropriate application or service client which may be used for that purpose.

Notably, the cellular telephone 112 may further include executable instructions which allow applications and service clients running on the cellular telephone 112 to send application or service data using either standard communication techniques or using an email envelope as a transport for the application are serviced data. In the example above, a cellular telephone was used for one concrete example. Notably other mobile devices may be used, and the preceding description should not be interpreted as limiting embodiments to only cellular telephone embodiments.

As mentioned previously, FIG. 1 further illustrates other mobile clients including the laptop computer 114 and the PDA 116. In the example illustrated in FIG. 1, the laptop computer 114 and PDA 116 are connected to a local area network 120 through a wireless connection illustrated by the antenna 122. The local area network is 120 is shown having a connection through a firewall 124 to the email service 110. Notably, in many embodiments, the local area network 120 will be connected to the email service 110 through the wide area network 104.

In some embodiments, the local area network 120 may include a local email service 126. As such, when application or service data is sent using an email envelope 108, the email envelope 108 is sent to the wide area network 104, to the email service 110, through the firewall 124, to the local area network 120, and to the local email service 126. The email envelope 108 can then be stored on the local email service 126 until requested by mobile clients, such as the laptop computer 114 or the PDA 116.

Notably, in many embodiments, no specialized equipment is needed to implement the email service 110 or the local email service 126. Rather, specialized software can be implemented at the service 102 and at mobile clients such as the laptop 114 and the PDA 116, which allows application or service data to be packaged in an email envelope 108 and sent between the service 102 and application or service clients running on the mobile devices including the laptop 114 and the PDA 116. This ability to reuse existing infrastructure may allow for a number of advantageous benefits to be realized. For example, in one embodiment, application or service data packaged in an email envelope 108 can pass through the firewall 124 as the firewall 124 treats the application and service data as a standard email message. Another advantageous benefit that can be achieved in some embodiments is the ability to reuse existing infrastructure without the need to deploy specialized hardware and software so as to facilitate the implementation of a store and forward messaging system for occasionally connected mobile devices.

Yet another advantageous benefit that may be achieved in some embodiments includes the ability to use existing signature and encryption techniques and/or email encryption techniques to secure the application and service data transmitted using the email envelope 108. For example, in one embodiment, encryption and signing at a runtime level may be performed. For example, application or service data may be encrypted and signed through a WS-Security protocol implementation which is a part of the runtime. The signed and encrypted data is then included in the email envelope 108. Additionally or alternatively, in one embodiment standard e-mail encryption such as S-MIME could be used to encrypt the email message packaged in the email envelope 108.

While standardized encryption techniques are described above, other embodiments may include other standardized standard-based protocol messages. For example, other WS protocols may be used to add additional information to the payload of the email message. In particular, in one embodiment, WS-ReliableMessaging may be used as a way to provide guaranteed ordered delivery of the application or service data.

Still another advantageous benefit that maybe realized includes the ability to secure the application and service data using challenge/password protection available with many email access techniques. In particular, to access email, a user often provides a username and password. As such, the application or service data can be protected by this password and username inherent in particular email access techniques.

Embodiments may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

Figure 2:
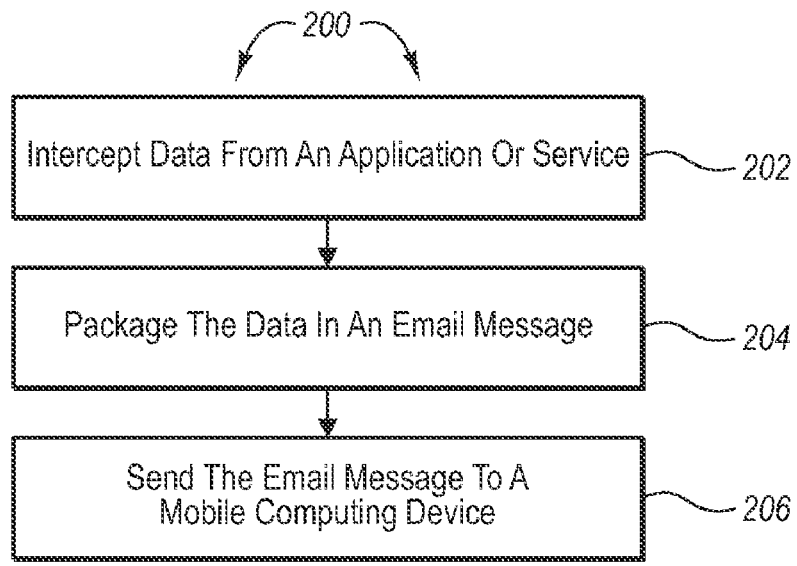
FIG. 2 illustrates a method of sending application or service data using an email transport.

Referring now to FIG. 2, a method 200 is illustrated. The method 200 may be practiced, for example, in a mobile network computing environment including mobile computing devices that may be occasionally or frequently disconnected from network connectivity. The method includes acts for sending application or service data that is typically sent via a network transport. The method includes an act of intercepting application or service data from an application or service (act 202). For example, The service 102 illustrated in FIG. 1 may include an application of service that generates data for applications or service clients running on one of the mobile computing devices 112, 114, 116 illustrated in FIG. 1.

The method 200 further includes packaging the application or service data in an email message (act 204). The email message may include the application or service data within the email envelope. The email message may further include an identification of an application or service client to which the application or service data should be applied at a client computer system. For example, as illustrated in FIG. 1, the email envelope 108 may include application or service data as discussed above. The email envelope 108 may further include information identifying a particular application or service client. As explained previously, several alternative methods may be used to identify the application or service client. For example, in one embodiment, the subject field of the email message may be used to identify a service or application to which the application or service data should be applied. In one embodiment, for example, the subject of the email message, or any other appropriate property may be used for multiplexing/demultiplexing purposes, similar to networking port. Thus, applications listening on a particular port, will receive messages sent to that port where the port is identified in the subject field.

Referring once again to FIG. 2, the method 200 further includes sending the email message through an email transport to a mobile client computer system (act 206). The mobile client computer system includes the application or service to which the application or service data should be applied. As illustrated in FIG. 1, the email envelope 108 may be sent to a mobile computing device such as the cellular telephone 112, the laptop computer 114 or the PDA 116.

The method 200 may be practiced where the application or service data is pushed from a server to the mobile client computer system. Typically, when an occasionally connected mobile device exists in a network, the mobile device requests application and service data. However, the store and forward nature of some embodiments described herein allows data to be pushed from a service rather than the data being requested from the service.

The method 200 may be performed as a fallback method when http or TCP fails. For example, FIG. 1 illustrates that traditional messages 106 may be sent. When those messages fail, email messages packaged in an email envelope 108 may be sent.

In one embodiment, the method 200 may be performed where the application or service data includes data from a Web Service. Web Services is a standardized way of integrating applications. Standardized XML documents can be used with SOAP (Simple Object Access Protocol) messages and WSDL (Web Services Description Language) descriptions to integrate applications without an extensive knowledge of the applications being integrated.

As noted previously, the method 200 may be performed such that packaging the application or service data in an email message includes encrypting the email message using one or more standardized email encryption protocols.

Figure 3:
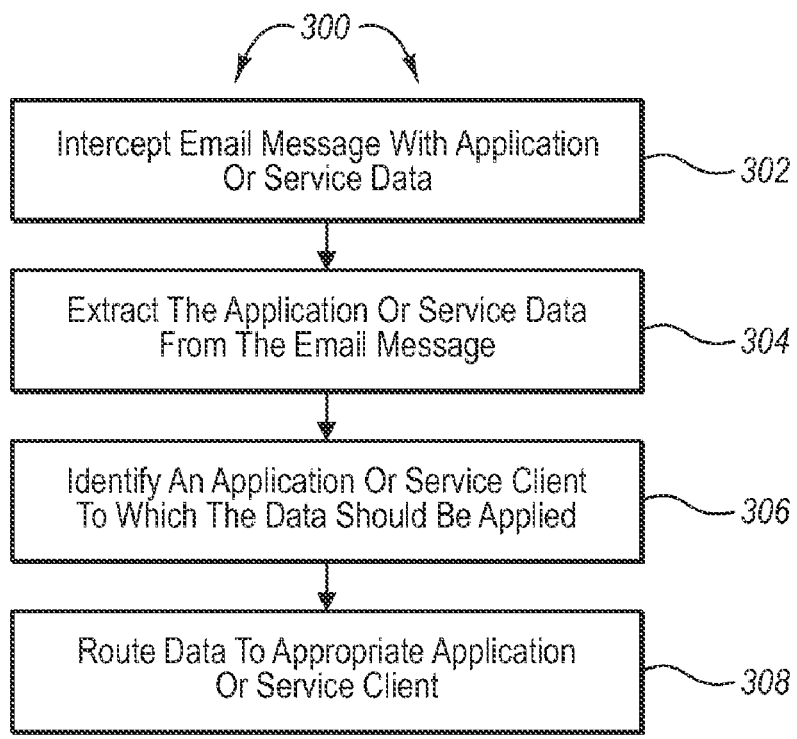
FIG. 3 illustrates a method of receiving application or service data using an email transport.

Referring now to FIG. 3, another embodiment is illustrated. FIG. 3 illustrates a method 300 may be practiced in a mobile network computing environment including mobile computing devices that may be occasionally or frequently disconnected from network connectivity. The method includes acts for receiving application or service data that is typically received via a network transport. The method includes intercepting an email message (act 302). The email message includes application or service data within the email envelope and an identification of an application or service to which the application or service data should be applied. This may be accomplished in any number of ways, including those previously set forth herein. In one particular embodiment, intercepting an email message may include identifying an email message addressed to a specific address. The address is used to identify a mobile client computer system to which the application or service data should be transmitted. The address may further be used to identify that the email message contains application or service data applicable to one or more applications or services.

The method 300 further includes extracting the application or service data from the email envelope (act 304). In one embodiment, the application or service data may be included in the body of the email envelope. The application or service data may be formatted in various formats such that the data can be appropriately identified as application and service data. For example, in one embodiment, the application and service data may be formatted according to an XML schema such that the application and service data is organized as a SOAP message for use with Web Services.

FIG. 3 further illustrates that method 300 includes an act of identifying from among a plurality of applications or services the application or service to which the application or service data should be applied (act 306). For example, a mobile device, such as the cellular phone 112, the laptop 114 or the PDA 116, may include a number of application that are able to receive application or service data from the email transport. One or more of these applications may be identified as an application to which the application or service data in the email message applied. Identifying the application or service to which the application or service data should be applied may include referencing a given email property. For example, an email property may act as a virtual networking port. An email property may be used for multiplexing and demultiplexing purposes similar to a networking port. Various email properties may be used. Illustratively, in one embodiment, an email field such as the subject field may be used.

The method 300 further includes an act of routing the application data to an appropriate application or services (act 308) as identified in the act of identifying from among a plurality of applications or services the application or service to which the application or service data should be applied.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise a computer storage medium such as RAM, ROM, EEPROM, CD-ROM or other optical disk storage, magnetic disk storage or other magnetic storage devices. Computer readable media can also comprise any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a mobile network computing environment including mobile computing devices that may be occasionally or frequently disconnected from network connectivity, a method of providing a fall-back transport so that when other transports fail due to disconnection of a mobile device from the network, receiving application or service data that is typically received via the other network transports can still be accomplished, the method comprising:

at a service connected to the network, intercepting service or application data from a service or application, and the service packaging the service or application data in an email envelope of an email message, the service also including in the email envelope an identification of an application or service to which the application or service data should be applied;

intercepting at an email server connected to the network the email message packaged with the service or application data and the identification of the application or service to which the application or service data should be applied;

from the email server, forwarding the email message to a mobile device and then extracting the application or service data from the email envelope along with the identification of the application or service to which the application or service data should be applied;

the mobile device then using the identification of the application or service to which the application or service data should be applied to identify from among a plurality of applications or services the application or service to which the application or service data should be applied; and in the event of a failure of other network transports, the email service then routing the application data to an appropriate application or service as identified.

2. The method of claim 1, wherein intercepting an email message comprises identifying an email message to a specific address, wherein the address is used to identify a mobile client computer system to which the application or service data should be transmitted to, further wherein the address is used to identify that the email message contains application or service data applicable to one or more of the plurality of applications or services.

3. The method of claim 1, wherein identifying from among a plurality of applications or services the application or service to which the application or service data should be applied comprises referencing a given email property, wherein the email property acts as a networking port.

4. The method of claim 3, wherein the given email property is a subject field.

5. The method of claim 1, further comprising receiving the email through a standard email encryption protocol.

6. The method of claim 1, further comprising:

verifying a signature used to sign the application or service data; and decrypting the application or service data.

7. The method of claim 6, wherein verifying and decrypting are performed using a WS-Security protocol.

8. The method of claim 1 further comprising:

sending the email message from the email service through an email transport to a mobile client computer system including the application or service to which the application or service data should be applied.

9. The method of claim 8, wherein the application or service data is pushed from a server to the mobile client computer system.

10. The method of claim 8, wherein a property of the email message is used to identify a service or application to which the application or service data should be applied.

11. The method of claim 10, wherein the property of the email message is a subject field of the email message.

12. The method of claim 8, wherein the application or service data comprises data from a Web Service.

13. The method of claim 8, further comprising sending the email message using one or more standardized email encryption protocols.

14. The method of claim 8, further comprising, prior to packaging the application or service data in an email message:

encrypting the application or service data; and signing the application or service data.

15. The method of claim 14, wherein encrypting the application or service data and signing the application or service data is performed using a WS-Security protocol.

16. The method of claim 8, wherein sending the email message through an email transport comprises sending the email to one or more standard email servers, the email servers requiring no specialized configuration to be able to transport the application or service data.

17. A computer storage medium comprising computer executable instructions configured to perform the method of claim 1.

* * * * *